(12) United States Patent
Eireos Garcia

(10) Patent No.: US 10,099,641 B2
(45) Date of Patent: Oct. 16, 2018

(54) HORN CIRCUIT

(71) Applicant: Dalphi Metal Espana S.A., Vigo (ES)

(72) Inventor: Fernando Jose' Eireos Garcia, Vigo (ES)

(73) Assignee: DALPHI METAL ESPANA S.A. (ES)

( * ) Notice: Subject to any disclaimer, the term of this patent is extended or adjusted under 35 U.S.C. 154(b) by 106 days.

(21) Appl. No.: 15/118,503

(22) PCT Filed: Feb. 20, 2015

(86) PCT No.: PCT/EP2015/000392
§ 371 (c)(1),
(2) Date: Aug. 12, 2016

(87) PCT Pub. No.: WO2015/124314
PCT Pub. Date: Aug. 27, 2015

(65) Prior Publication Data
US 2017/0174166 A1  Jun. 22, 2017

(30) Foreign Application Priority Data
Feb. 20, 2014  (EP) .................................. 14000604

(51) Int. Cl.
*B60R 21/203* (2006.01)
*B60Q 5/00* (2006.01)

(52) U.S. Cl.
CPC .......... *B60R 21/2037* (2013.01); *B60Q 5/003* (2013.01)

(58) Field of Classification Search
CPC ............................ B60R 21/2037; B60Q 5/003
See application file for complete search history.

(56) References Cited

U.S. PATENT DOCUMENTS

| | | | |
|---|---|---|---|
| 6,675,675 B1 | 1/2004 | Sauer et al. | |
| 6,830,263 B2 * | 12/2004 | Xu | ....................... B60R 21/2037 280/728.2 |
| 7,566,071 B2 * | 7/2009 | Tsujimoto | .............. B60Q 5/003 280/731 |
| 2002/0043786 A1 | 4/2002 | Schutz | |
| 2003/0151237 A1 | 5/2003 | Xu et al. | |
| 2004/0046367 A1 | 3/2004 | Schneider et al. | |
| 2004/0178611 A1 | 9/2004 | Simpson | |
| 2006/0016613 A1 | 1/2006 | McLauchlan | |
| 2006/0175816 A1 | 8/2006 | Spencer et al. | |
| 2010/0066066 A1 | 3/2010 | Sakurai et al. | |

(Continued)

FOREIGN PATENT DOCUMENTS

WO   2009156153   12/2009

*Primary Examiner* — James A English
(74) *Attorney, Agent, or Firm* — Tarolli, Sundheim, Covell & Tummino LLP

(57) ABSTRACT

The present invention provides a horn circuit (15) for activating a horn of a vehicle which is adapted to be integrated in an airbag module (3) of a vehicle or in ah attachment member (5) for connecting the airbag module (3) to the steering wheel, comprising at least two contact elements (17, 19), wherein a horn signal is produced when the at least two contact elements (17, 19) electrically contact with each other. The horn circuit (15) according to the present invention is characterized in that the at least two contact elements (17, 19) are adapted to electrically connect with each other by means of at least one conductive spring element (9) for fixing an airbag module (3) to a steering wheel.

19 Claims, 4 Drawing Sheets

(56) References Cited

U.S. PATENT DOCUMENTS

Figure 1:
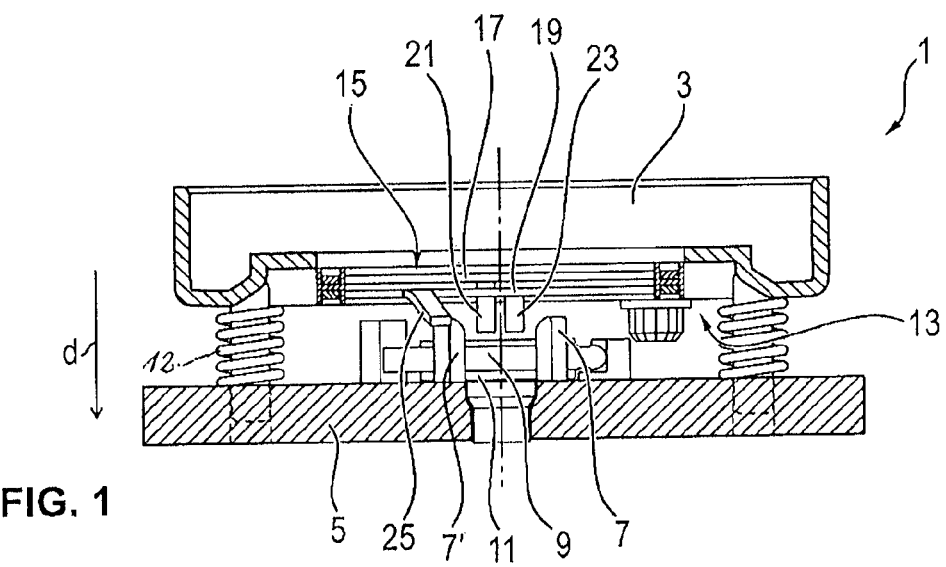

| | | | | |
|---|---|---|---|---|
| 2011/0101650 A1* | 5/2011 | Nebel | ............... | B60Q 5/003 280/728.1 |
| 2012/0080868 A1 | 4/2012 | Banno et al. | | |
| 2015/0307051 A1* | 10/2015 | Collazo | ............ | B60Q 5/003 280/728.3 |

* cited by examiner

HORN CIRCUIT

RELATED APPLICATION

This application corresponds to PCT/EP2015/000392, filed Feb. 20, 2015, which claims the benefit of European Application No. 14000604.0 filed Feb. 20, 2014, the subject matter, of which is incorporated herein by reference in their entirety.

The present invention relates to a horn system for a vehicle.

Horn systems for vehicles are generally known in the art. They are used to produce a warning signal for road safety reasons. In the majority of modern vehicles, the horn circuit is integrated together with an airbag module in the steering wheel of the automotive vehicle. Fixing arrangements for attaching the airbag module to a steering wheel are for example described in EP 2 213 523 A1 and EP 2 145 801 A1. Conventional horn circuits comprise at least two contact elements, which when electrically contact with each other produce a horn signal. The horn circuit is usually arranged such that one contact element is fixed, while the other contact element is moveable so as to touch the fixed contact element. Moving the contact element and thereby touching the other contact element will close the horn circuit and an audible warning signal will be produced by means of an appropriate sound generator. Owing to this configuration, conventional horn circuits require a large space to accommodate the two contact elements and to provide a sufficient distance between them. The space requirements of conventional horn circuits form a severe problem in light of the present trend of miniaturisation, especially in the automotive industry. This is particularly true, if not only the horn circuit but also an airbag module is to be integrated in the steering wheel of a vehicle.

It is therefore an object of the present invention to provide a compact and reliable horn system, which is easy to implement and which requires only little space compared with conventional horn systems.

According to a first aspect, the object is solved in an inventive manner by a Horn System for a vehicle comprising an airbag module having a plurality of hook elements for the attachment to a steering wheel or an attachment member for attaching the airbag module to the steering wheel, and an integrated horn circuit which comprises two contact elements, that are arranged adjacent to each other at a ring shaped carrier member and which is formed as a separate compact entity configured to be placed at the airbag module in such manner that a horn signal may be produced when each of at least two contact elements, gets in direct electrical contact with one of a plurality of conductive spring elements configured to act as contact closing members for electrically connecting the two contact elements, upon activating the horn of the vehicle and being seated at the steering wheel or the attachment member for fixing the hook elements of the airbag module thereto.

According to a second aspect, the object is solved in an inventive manner by a Horn System for a vehicle comprising a Steering wheel having a plurality of hook elements for the attachment of an airbag module or an attachment member for attaching the airbag module to the steering wheel, and an integrated horn circuit which comprises two contact elements, that are arranged adjacent to each other at a ring shaped carrier member and which is formed as a separate compact entity configured to be placed at the steering wheel in such manner that a horn signal may be produced when each of at least two contact elements, gets in direct electrical contact with one of a plurality of conductive spring elements configured to act as contact closing members for electrically connecting the two contact elements, upon activating the horn of the vehicle and being seated at the airbag module or the attachment member for fixing the hook elements of the steering wheel thereto.

According to a third aspect, the object is solved in an inventive manner by a Horn System for a vehicle comprising an attachment member configured to be connected to an airbag module or to a steering wheel and having a plurality of hook elements for attaching steering wheel or the airbag module to the attachment member, and an integrated horn circuit which comprises two contact elements, that are arranged adjacent to each other at a ring shaped carrier member and which is formed as a separate compact entity configured to be placed at the attachment member in such manner that a horn signal may be produced when each of at least two contact elements, gets in direct electrical contact with one of a plurality of conductive spring elements configured to act as contact closing members for electrically connecting the two contact elements, upon activating the horn of the vehicle and being seated at the airbag module or at the steering wheel for fixing the hook elements of the attachment member thereto.

By providing any such a horn system, the structural complexity of the Arrangement of airbag module and steering wheel can be greatly reduced, and assembly of all components forming the airbag module and/or the steering wheel can be simplified.

According to an embodiment, it is preferred that the at least two contact elements, are arranged adjacent to be situated substantially above each other in a horn activating direction d.

According to an embodiment, it is preferred that the at least two contact elements, have a substantially identical shape, in particular a ring-shape, wherein the two substantially identical contact elements, are arranged in parallel to each other.

According to an embodiment, it is preferred that each of the two contact elements, comprises a plurality of latches, the plurality of latches being arranged in pairs of latches, each pair of latches comprising one latch of each contact element, configured such that each latch of a pair of latches can directly contact a respective one of the plurality of conductive spring elements for electrically connecting the two contact elements, for the activation of a horn signal.

According to an embodiment, it is preferred that the horn circuit comprises a plurality of radial arms, each arm locating one latch of each of the at least two contact elements, the two latches of each radial arm being arranged adjacent to each other and to be situated to face one of the plurality of conductive spring elements in an operating position of the horn circuit.

According to an embodiment, it is preferred that the latches of the two contact elements, are arranged in pairs in a distance from each other, wherein the distance between the latches is smaller than the length of a respective one of the plurality of conductive spring elements.

According to an embodiment, it is preferred that, in an operating position of the horn circuit, each of the plurality of conductive spring elements is located between the hook elements and at least a portion of the two contact elements, in a horn activating direction d.

According to an embodiment, it is preferred that the carrier member forms a housing by which the two contact elements, are at least partially surrounded and/or which is adapted to be positioned in a bottom portion of the airbag module or on a surface of the steering wheel or the attachment member.

According to an embodiment, it is preferred that the horn circuit is arranged between the airbag module and one of the attachment member and the steering wheel in the state of the airbag module being assembled to the steering wheel system.

According to an embodiment, it is preferred that the horn circuit is attached to a bottom portion of the steering wheel's receiving opening for the airbag module facing the attachment member or the airbag module in an assembled state of the steering wheel system.

According to an embodiment, it is preferred that al least a portion of the steering wheel is located between the airbag module and the attachment member.

The horn system serves for activating a horn of a vehicle, which is adapted to be integrated in an airbag module of the vehicle or in an attachment member for connecting the airbag module to the steering wheel or into the steering wheel.

The attachment member may form an integral part of the steering wheel or the airbag member or may be formed as a separate element, which is (releasably) connected to the steering wheel for connecting the airbag module to the steering wheel. The attachment member may be situated on either the front or the rear side of the steering wheel. The attachment member may hold a plurality of conductive spring elements or a plurality of hook elements.

The horn circuit comprises at least two contact elements, wherein a horn signal is produced when the at least two contact elements are (indirectly) in electrical contact with each other. The horn circuit which comprises the the at least two contact elements are adapted to electrically connect each other by means of at least one conductive spring element for fixing an airbag module to a steering wheel.

In particular, the invention provides a horn circuit for activating a horn of a vehicle, which is adapted to be attached to one of: an airbag module for a vehicle, an attachment member for connecting the airbag module to a steering wheel, and the steering wheel, the horn circuit comprising at least two contact elements, wherein a horn signal is produced when the at least two contact elements get in direct or indirect electrical contact; therein the at least two contact elements are arranged adjacent to each other and form a compact entity.

By providing such a horn circuit as a separate entity, the structural complexity of the airbag module and the steering wheel can be greatly reduced, and assembly of all components forming the airbag module and the steering wheel can be simplified.

Further, by providing such a horn circuit as a separate entity, the same horn circuit may be utilized in different designs of airbag modules and the steering wheels, being adapted specifically to the varying needs of different vehicles, without need of adaptation of the horn circuit, such that a more economical manufacturing is achieved.

According to a preferred embodiment, the at least two contact elements are arranged adjacent to one another and/or situated substantially above each other in a horn activating direction. Preferably they are bound to one another by a cage formed from synthetic material. Further preferably, the cage has a substantially similar shape, in particular a ring-shape, as the contact elements do.

According to a further preferred embodiment the horn circuit comprises at least one conductive spring element which is configured to fix the airbag module to a steering wheel and to act as a contact closing member for electrically connecting the two contact elements upon activating the horn of a vehicle.

An important advantage of the present invention is that the horn circuit fits into available unused room of the steering wheel, which is usually present between an airbag module and an attachment member for connecting the airbag module to a steering wheel. The horn circuit as part of the horn system according to the present invention can therefore easily be integrated in an existing steering wheel airbag module, without requiring additional space. An electrical connection between the at least two contact elements of the horn circuit can be realised by a conductive spring element, which is present in the vehicle for attaching the airbag module to the steering wheel. Thus, existing elements may be used for realising an electrical connection between the at least two contact elements.

Furthermore, it is advantageous that there is no relative movement between parts of the horn circuit required. Rather, the horn circuit is activated by moving the complete horn circuit unit relative to an attachment member of a vehicle in a steering wheel system. In other words, the electrical connection between the at least two contact elements of the horn circuit is not performed by moving the two contact elements relative to each other but by either moving the two contact elements simultaneously relative to a third part, or by moving a third part (conductive spring element) relative to the two fixed contact elements. Thus, the present invention does not only provide for a horn circuit which is easy to implement and less expensive to manufacture, but in addition to a horn circuit which can be integrated in existing space without the need for providing an extra space. Furthermore, since the electrical connection between the two contact elements is established by means of an existing means for connecting the airbag module to the steering wheel, namely by means of the spring element, no additional device or element is required for closing the horn circuit.

In a preferred configuration of the present invention, the at least two contact elements are arranged adjacent to each other and form a compact entity. This is possible because the at least two contact elements do not require a relative movement to each other. Furthermore, the two contact elements are substantially flat and electrically isolated from each other. Owing to this configuration, the electrical contact between the two contact elements will only establish, if the at least two contact elements are electrically connected to each other by touching the at least one conductive spring element.

In a further advantageous configuration of the invention, the at least two contact elements are formed as wires or plates. Owing to this substantially flat configuration, the horn circuit can easily be integrated in existing space of the airbag module or an attachment member for connecting the airbag module to a steering wheel. More specifically, each of the at least two contact elements may substantially have an identical form, which is preferably ring-shaped, wherein the two substantially identical (ring-)shaped contact elements are arranged in parallel to each other. Owing to this parallel and preferably neighbouring configuration of the two contact elements, the two contact elements can be arranged in a space saving manner. It is to be understood that in order to prevent an electrical contact between the at least two contact elements prior to the activation of the horn circuit, it is necessary to isolate the two contact elements by means of an isolating material. The isolative material is at least partially arranged between the two contact elements and forms an intermediate layer electrically separating the two elements.

For contacting the conductive spring element, each of the two contact elements preferably comprises at least one latch. The latches of the at least two contact elements may be arranged pairwise in a (small) distance from each other. More specifically, the distance between the latches should be smaller than the length of the conductive spring element, such that an electrical connection can be established between the two contact elements when touching the conductive spring element.

Furthermore, the at least two contact elements may at least partially be surrounded by a housing. Preferably, the housing is adapted to be positioned in a bottom portion of an airbag module and to be attached thereto. In a different configuration, however, the housing may be adapted to be positioned in ah upper portion of an attachment member for connecting the airbag module to the steering wheel.

The present invention also provides an airbag module for the attachment to a steering wheel or an attachment member for attaching the airbag module to the steering wheel, wherein the airbag module further comprises an integrated horn circuit which is attachable to the to the airbag module and adapted to be activated by at least one conductive spring element, located at one of: the airbag module, the steering wheel, and the attachment member, the horn circuit being configured according to at least one of embodiments described above.

The present invention also provides a steering wheel system comprising at least one conductive spring element for the attachment of an airbag module and/or an attachment member for attaching the airbag module to the steering wheel, wherein the steering wheel system further comprises an integrated horn circuit which is attachable to the to the steering wheel and adapted to be activated by the at least one conductive spring element, the horn circuit being configured according to at least one of the embodiments described above.

Preferably, the horn circuit is arranged between the airbag module and the attachment member in the assembled state of the steering wheel system. In this configuration, the horn circuit may be attached to a bottom portion of the airbag module facing the attachment member in an assembled state of the steering wheel system. In another configuration, the horn circuit may also be attached to an upper portion of the attachment member facing the airbag module in an assembled state of the steering wheel system.

Preferably, the horn circuit is attached to a bottom portion of the steering wheel's receiving opening for the airbag module facing the attachment member or the airbag module in an assembled state of the steering wheel system.

Furthermore, the at least one conductive spring element may be attached to the airbag module or alternatively to the attachment member. The at least one conductive spring element is preferably adapted to cooperate with a hook element, which is connected to the respective other part of the airbag module or the attachment member. That is, if the conductive spring element is attached to the airbag module, the hook element is attached to the attachment member and if the conductive spring element is attached to the attachment member, the hook element is associated with the airbag module.

The present invention also provides for a vehicle, in particular an automotive vehicle, which comprises a horn circuit or a horn system, according to the present invention.

Figure 2:
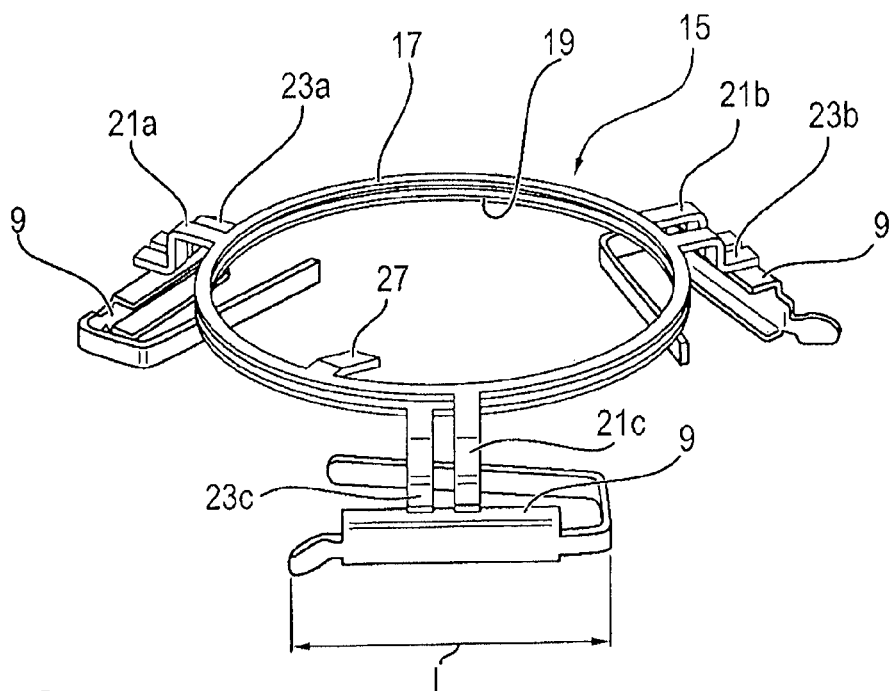
Figure 3:
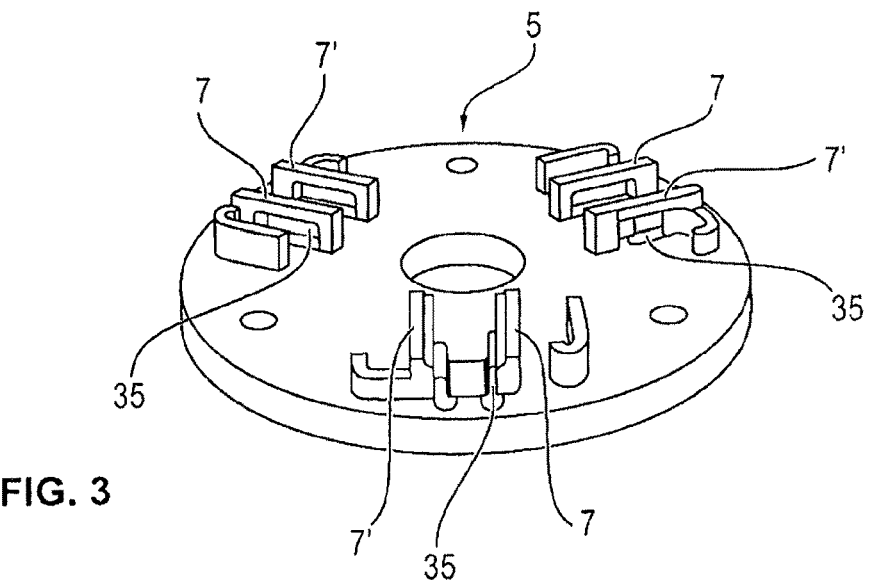
Figure 4:
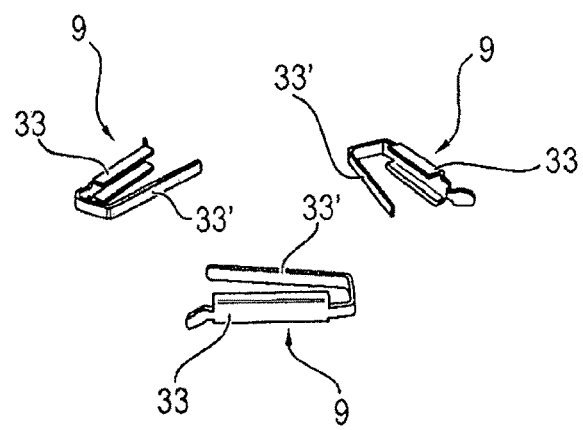
Figure 5:
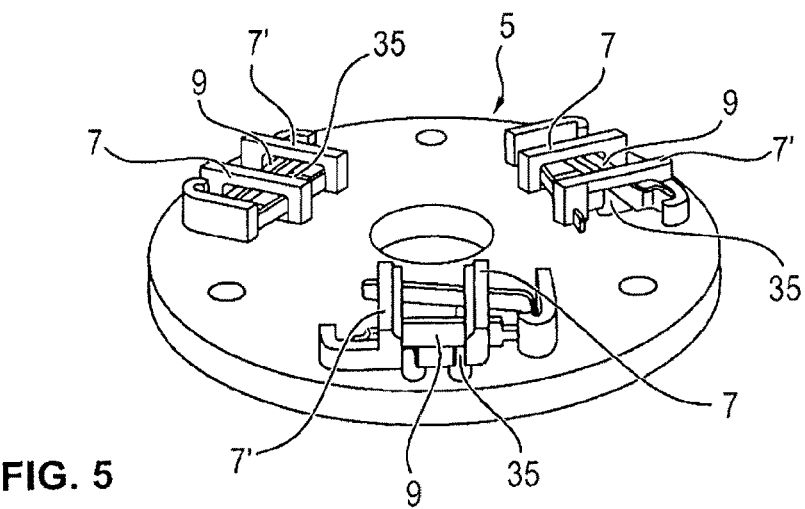
Figure 6:
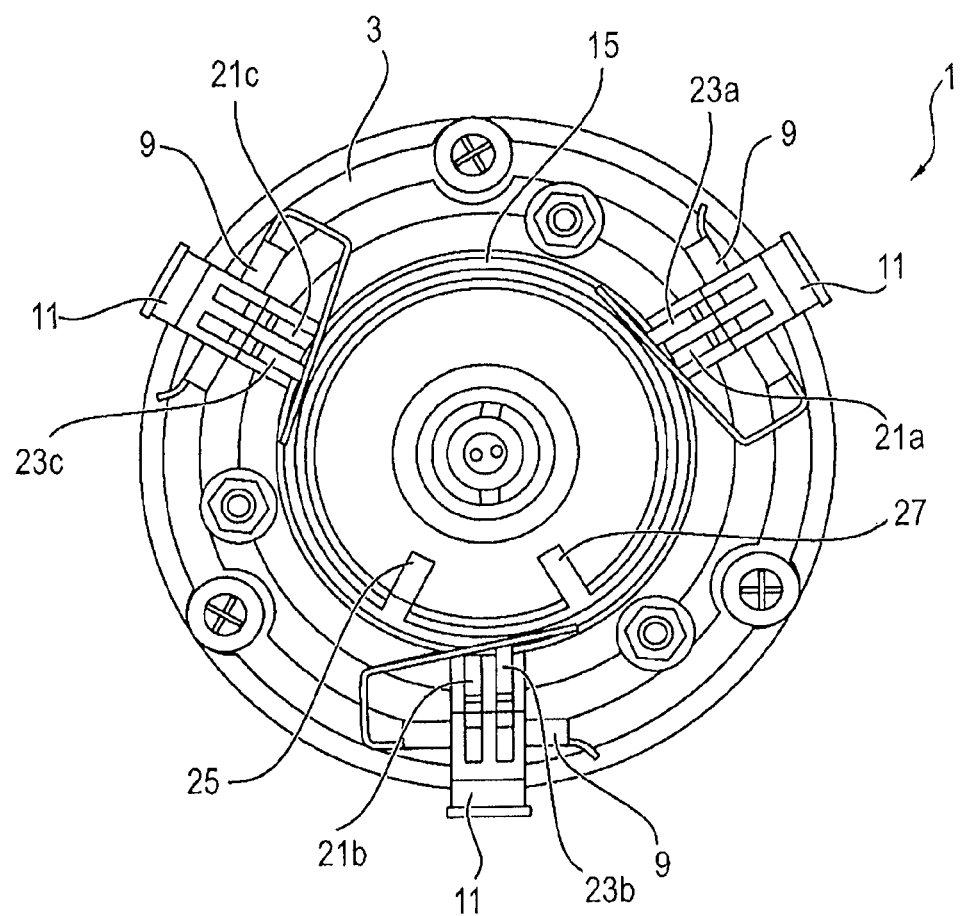
Figure 7:
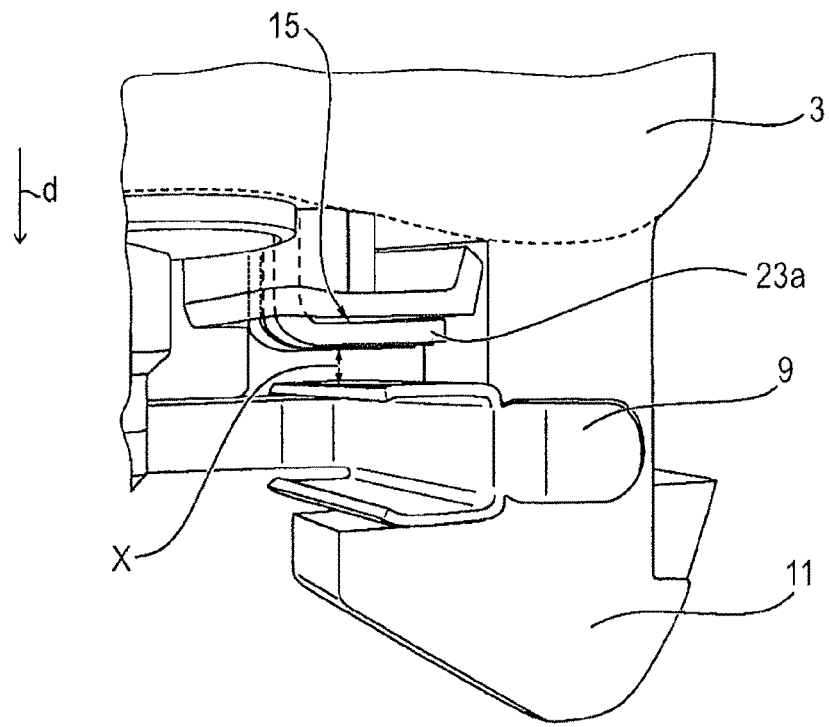
Figure 8:
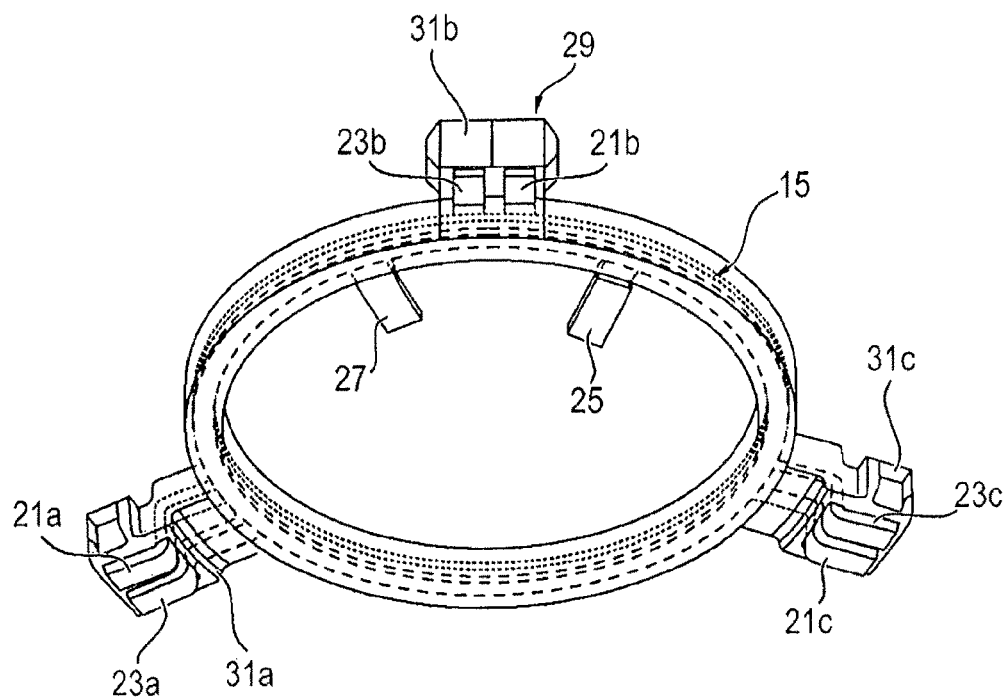

The invention is in the following described by means of the drawings, which are as follows:

FIG. 1 A schematic cross-sectional view of a horn system according to the present invention;

FIG. 2 A perspective view of a horn system according to the present invention with three contact elements for contacting respective spring elements;

FIG. 3 A perspective view of an attachment member for connecting an airbag module to a steering wheel;

FIG. 4 A perspective view of three conductive spring elements for fixing an airbag module to a steering wheel;

FIG. 5 A perspective view of an attachment member with three conductive spring elements in an assembled state;

FIG. 6 A bottom view of a steering wheel system according to the present invention;

FIG. 7 An enlarged view of a portion of the steering wheel system according to the present invention, and FIG. 8 A perspective view of a horn circuit being at least partially surrounded by a housing.

FIG. 1 shows a schematic cross-sectional view of a horn wheel system 1 according to the present invention. The horn system or steering wheel system 1 comprises an airbag module 3 and an attachment member 5 for connecting the airbag module to a steering wheel (not illustrated, but according to one embodiment, the reference numeral 5 may also be interpreted to designate a portion of the skeleton of a steering wheel).

The attachment member 5 is in the present example formed as a separate element, which is connectable to a steering wheel. However, in another embodiment, the attachment member 5 may form an integral part of the steering wheel, for example of the metal skeleton, which is a more compact solution. For fixing the airbag module 3 to the steering wheel, the attachment member 5 comprises two parallel bridges 7 and 7' for holding a releasable spring element 9, which extends through the bridges 7 and 7'.

The spring element 9 serves for retaining a hook element 11, which can best be seen in FIG. 7. The hook element 11 is attached to a bottom portion 13 of the airbag module 3 at a radially outer portion thereof, wherein the bottom portion 13 of the airbag module 3 faces the attachment member 5 in the assembled state of the steering wheel system 1. As can be seen in more detail in FIGS. 3-5 and FIG. 7, the hook element 11 may be a snap-fitting or clip-in-hook, which must be engaged with the spring element 9 in order to fix the airbag module to a steering wheel.

In the present embodiment, a horn circuit 15 is arranged at the lower portion 13 of the airbag module 3. The horn circuit 15 comprises a conductive material and comprises a first contact element 17 and a second contact element 19. In the present case, the first and second contact elements 17 and 19 are substantially formed as flat and ring-shaped plates, which are arranged in parallel and adjacent to each other. In order to prevent an electrical connection of the first and second contact elements 17 and 19 prior to activating the horn circuit manually, an isolative material is provided between the first and second contact elements 17 and 19.

Each of the first and second contact elements 17 and 19 comprises in the present embodiment three latches 21a-21c and 23a-23c, respectively, for contacting s respective spring element 9, which is made from a conductive material. As can be seen from FIGS. 1 and 2, the first and second contact elements 17 and 19 have a substantially identical size and shape and are slightly offset to each other in a circumferential direction such that a latch 21a-21c of the first contact element 17 and a latch 23a-23c of a second contact element are arranged pairwise and adjacent to each other. As a result, there exists only a small distance between the latches 21a/23a, 21b/23b and 21c/23c. It is important to note that the distance between two latches forming a pair should be such that there is no electrical contact between them or the first and second contact elements and such that the distance is smaller than the length l of a conductive spring element 9.

As can be seen from FIG. 2, each pair of latches 21a/23a, 21b/23b and 21c/23c is associated with a dedicated conductive spring element 9. That is, the steering wheel system 1 according to claim 1 comprises three spring elements 9, which have a double function. Firstly, they fix the airbag module 3 to the steering wheel via the attachment member 5 and secondly, they are used for providing an electrical connection between the first and second contact elements 17 and 19, when the horn circuit is activated manually by pressing the airbag module 3 in a downward direction d towards the attachment member 5.

The Horn circuit may comprise connection elements 25 and 27 to connect the horn circuit to electric cables coming from the vehicle side.

Further resilient distance elements 12a-c, e.g. in the form of coil springs, are provided between the airbag module 3 and the steering wheel (or the adapter plate 5) for urging or biasing the airbag module 3 in the resting position opposite to the downward direction d and to separate elements 21,23 and 9 when horn activation is not required.

As can further be seen from FIGS. 1 and 2, the horn circuit 15 is arranged at the bottom portions 13 of the airbag module 3 and the latches 21,23 are aligned with the spring elements 9. Thus, the circumferential position of the latches substantially corresponds to the circumferential position of the spring elements and the hook elements.

FIGS. 3 to 5 are perspective views of a circular shaped attachment member 5, which in the present case is formed as a separate part of the steering wheel. FIG. 4 shows the substantially U-shaped spring elements, which have two substantially parallel arms 33 and 33' for engaging the hook element 11. The spring element 9 is at least partially made from a conductive material and the arms 33, 33' are preferably resilient such that a hook element 11 (not illustrated) can be retained in an opening 15, wherein the opening 15 is arranged between and below the bridges 7, 7' in the attachment member 5 (see FIGS. 3 and 5).

FIG. 6 is a bottom view of a steering wheel system 1 according to the present invention, wherein the attachment member 5 is omitted for reasons of clarity except for the spring element 9. As can clearly be seen, the horn circuit 15 is concentrically arranged on the bottom portion 13 of the airbag module 3, which has a round cross-sectional shape. Furthermore, the pairs of latches attached to the first and second contact elements 17 and 19 are symmetrically arranged such that the position of the latches coincides with the position of the spring elements 9 and the hook elements 11 in the assembled state of the steering wheel system 1.

FIG. 7 is a detailed view of the steering wheel system 1. As can be seen, the hook element 11 is engaged by the spring element 9 and thereby fixes the airbag module 3 to the attachment member 5 (not illustrated). FIG. 7 further shows that in the normal, i.e. non-activated state of the horn circuit 15, the latches 21a-21c and 23a-23c are provided in a distance x from the upper surface of the spring elements 9. In the event that a compressive force is applied on the airbag module 3 in the downward direction d, the horn circuit 15 and thereby the latches 21, 23 are moved in the direction towards the spring element 9. During movement of the horn circuit 15, i.e. during the movement of the first and second contact elements 17 and 19, distance elements 12a-c are deformed or depressed until the latches contact the spring element 9. During movement of the airbag module 3 also the hook elements 11 are relatively moved with respect to the spring elements 9, which however, has no negative effect on the engagement of these two parts.

Preferably, the latches 21 and 23 of the first and second contact elements 17 and 19 are arranged in a same plane or in other words on a same height level in the downward direction d such that the pairwise arranged latches contact the associated spring element 9 at the same time and thus establishing an electrical connection between the first and second contact elements 17 and 19. Upon establishing an electrical connection between the first and second contact elements 17 and 19, the horn circuit 15 is closed and a horn signal is produced in order to warn pedestrians or other vehicle drivers.

As can be seen from FIG. 8, the horn circuit 15 and thus the first and second contact elements 17 and 19 are preferably arranged in a housing 29, which at least partially surrounds the contact element 17, 19. The housing 29 has preferably a similar shape than the first and second contact elements 17, 19 and is constructed such that the latches are arranged in radially extending hollow arms 31a-31c. In the present embodiment, the ring-shaped main body of the contact element 17, 19 is completely embedded in the housing 29, whereas electrical connection endings 25, 27 as well as the latches 21, 23 of the contact element 17, 19 are exposed and thus are not fully surrounded by the housing 29, such that they can get in touching contact with the spring elements 9 and the attachment member 5, respectively.

The skilled person will understand that the horn circuit 15 may also be attached to the attachment member 5. This is particularly the case, if the hook members 11 are located on the attachment member 5 and the bridges 7, 7', the openings 35 and the spring elements 9 are attached to the airbag module 3. In this case, the horn circuit unit 15 will be fixedly installed, while the spring elements 9 will move together with the airbag module 3 in order to touch the latches 21, 23 and to thereby close the horn circuit. Thus, the present invention is not restricted to a horn circuit 15, which is attached to the airbag module 3. Rather, the horn circuit 15 may be alternatively arranged on the attachment member 5, which may form an integral or a separate part of the steering wheel.

It should further be noted that the size and shape of the horn circuit 15 may vary depending on the available space between the airbag module and the attachment member, and depending on the shape and size of the airbag module and the attachment member, respectively. Furthermore, different sizes and shapes of the spring element may necessitate an appropriate modification of the horn circuit design.

In conclusion, the present invention provides for an advantageous space saving horn circuit, which does not need any extra space or additional devices, but which can easily be placed in existing space between the airbag module 3 and the attachment member 5 and which can be activated by existing elements of the steering wheel unit.

LIST OF REFERENCE NUMERALS

1 Steering wheel system
3 Airbag module
5 Attachment member
7, 7' Bridge
9 Spring element
11 Hook element
12a-c Distance elements
13 Bottom portion
15 Horn circuit
17 First contact element 19 Second contact element
21a-c Latch
23a-c Latch
25, 27 Electrical connection endings
29 Housing
31 Arms
33, 33' Arms
35 Opening
l Length
d Downward direction, horn activating direction
x Distance

The invention claimed is:

1. A steering wheel mounted horn system for a vehicle comprising:
an airbag module;
a plurality of hook elements for attaching the airbag module to the steering wheel;
a plurality of spring elements for engaging the hook elements to attach the airbag module to the steering wheel; and
an integrated horn circuit comprising two contact elements that are arranged adjacent to each other at a ring shaped carrier member which is formed as a separate compact entity configured to be placed between the airbag module and the steering wheel, wherein the spring elements are electrically conductive and configured to act as contact closing members for electrically connecting the two contact elements to activate the horn of the vehicle.

2. The horn system recited in claim 1, wherein the hook elements are mounted to one of the airbag module and the steering wheel and the spring elements are mounted to the other of the airbag module and the steering wheel.

3. The horn system recited in claim 2, wherein the hook elements are mounted to one of the airbag module and an attachment member and the spring elements are mounted to the other of the airbag module and the attachment member, wherein the attachment member is configured to be connected to the steering wheel.

4. The horn system recited in claim 1, wherein the hook elements are mounted to the airbag module and the spring elements are mounted to the steering wheel.

5. The horn system recited in claim 1, wherein the hook elements are mounted to the airbag module and the spring elements are mounted to an attachment member that is configured to be connected to the steering wheel.

6. The horn system recited in claim 1, wherein the at least two contact elements are arranged adjacent to be situated substantially above each other in a horn activating direction.

7. The horn system recited in claim 1, wherein at least two contact elements have a substantially identical shape, wherein the two substantially identical contact elements are arranged in parallel to each other.

8. The horn system recited in claim 1, wherein each of the two contact elements comprises a plurality of latches, the plurality of latches being arranged in pairs of latches, each pair of latches comprising one latch of each contact element configured such that each latch of a pair of latches can directly contact a respective one of the plurality of conductive spring elements for electrically connecting the two contact elements for the activation of a horn signal.

9. The horn system recited in claim 8, wherein the horn circuit comprises a plurality of radial arms, each arm locating one latch of each of the at least two contact elements, the two latches of each radial arm being arranged adjacent to each other and to be situated to face one of the plurality of conductive spring elements in an operating position of the horn circuit.

10. The horn system recited in claim 8, wherein the latches of the two contact elements are arranged pairwise in a distance from each other, wherein the distance between the latches is smaller than the length of a respective one of the plurality of conductive spring elements.

11. The horn system recited in claim 1, wherein an operating position of the horn circuit, each of the plurality of conductive spring elements is located between the hook elements and at least a portion of the two contact elements in a horn activating direction.

12. The horn system recited in claim 1, wherein the carrier member forms a housing by which the two contact elements are at least partially surrounded, wherein the carrier member is adapted to be positioned in one of a bottom portion of the airbag module, a surface of the steering wheel, and an attachment member that is configured to be connected to the steering wheel.

13. The horn system recited in claim 1, wherein the horn circuit is arranged between the airbag module and one of the steering wheel and an attachment member that is configured to be connected to the steering wheel in the state of the airbag module being assembled to the steering wheel system.

14. The horn system recited in claim 1, wherein the horn circuit is attached to a bottom portion of a receiving opening of the steering wheel for the airbag module facing an attachment member or the airbag module in an assembled state of the steering wheel system.

15. The horn system recited in claim 1, wherein at least a portion of the steering wheel is located between the airbag module and an attachment member.

16. A horn system for a vehicle comprising an airbag module having a plurality of hook elements for the attachment to a steering wheel or an attachment member for attaching the airbag module to the steering wheel, and an integrated horn circuit which comprises two contact elements that are arranged adjacent to each other at a ring shaped carrier member and which is formed as a separate compact entity configured to be placed at the airbag module in such manner that a horn signal may be produced when each of at least two contact elements gets in direct electrical contact with one of a plurality of conductive spring elements configured to act as contact closing members for electrically connecting the two contact elements upon activating the horn of the vehicle and being seated at the steering wheel or the attachment member for fixing the hook elements of the airbag module thereto.

17. A horn system for a vehicle comprising a Steering wheel having a plurality of hook elements for the attachment of an airbag module or an attachment member for attaching the airbag module to the steering wheel, and an integrated horn circuit which comprises two contact elements that are arranged adjacent to each other at a ring shaped carrier member and which is formed as a separate compact entity configured to be placed at the steering wheel in such manner that a horn signal may be produced when each of at least two contact elements gets in direct electrical contact with one of a plurality of conductive spring elements configured to act as contact closing members for electrically connecting the two contact elements upon activating the horn of the vehicle and being seated at the airbag module or the attachment member for fixing the hook elements of the steering wheel thereto.

18. A horn system for a vehicle comprising an attachment member configured to be connected to an airbag module or to a steering wheel and having a plurality of hook elements for attaching steering wheel or the airbag module to the attachment member, and an integrated horn circuit which comprises two contact elements that are arranged adjacent to each other at a ring shaped carrier member and which is formed as a separate compact entity configured to be placed at the attachment member in such manner that a horn signal may be produced when each of at least two contact elements gets in direct electrical contact with one of a plurality of conductive spring elements configured to act as contact closing members for electrically connecting the two contact elements upon activating the horn of the vehicle and being seated at the airbag module or at the steering wheel for fixing the hook elements of the attachment member thereto.

19. The horn system recited in claim 7, wherein at least two contact elements have a substantially identical ring-shape.

\* \* \* \* \*